(12) United States Patent
Kobayashi et al.

(10) Patent No.: US 9,284,688 B2
(45) Date of Patent: Mar. 15, 2016

(54) COPOLYMER LATEX AND COMPOSITION CONTAINING THE SAME AND APPLICATION PRODUCT THEROF

(75) Inventors: Kunihiko Kobayashi, Minato-ku (JP); Katsuhiko Sakata, Minato-ku (JP); Tsukasa Iwamoto, Minato-ku (JP); Nobuhiro Matsuda, Minato-ku (JP); Osamu Ishikawa, Minato-ku (JP)

(73) Assignee: JSR Corporation, Tokyo (JP)

( * ) Notice: Subject to any disclaimer, the term of this patent is extended or adjusted under 35 U.S.C. 154(b) by 611 days.

(21) Appl. No.: 13/638,099

(22) PCT Filed: Mar. 29, 2011

(86) PCT No.: PCT/JP2011/057740
§ 371 (c)(1),
(2), (4) Date: Sep. 28, 2012

(87) PCT Pub. No.: WO2011/122595
PCT Pub. Date: Oct. 6, 2011

(65) Prior Publication Data
US 2013/0017402 A1   Jan. 17, 2013

(30) Foreign Application Priority Data
Mar. 31, 2010   (JP) ................. 2010-083457

(51) Int. Cl.
| | | |
|---|---|---|
| *C08F 285/00* | (2006.01) | |
| *C08F 2/26* | (2006.01) | |
| *C08F 236/06* | (2006.01) | |
| *D21H 19/58* | (2006.01) | |
| *D21H 19/20* | (2006.01) | |
| *D21H 19/48* | (2006.01) | |
| *D21H 21/52* | (2006.01) | |

(52) U.S. Cl.
CPC *D21H 19/58* (2013.01); *C08F 2/26* (2013.01); *C08F 285/00* (2013.01); *D21H 19/20* (2013.01); *D21H 19/48* (2013.01); *D21H 21/52* (2013.01); *C08F 236/06* (2013.01); *Y10T 428/31906* (2015.04)

(58) Field of Classification Search
None
See application file for complete search history.

(56) References Cited

U.S. PATENT DOCUMENTS 4,831,365 A * 5/1989 Thomas et al. ............ 340/680
5,700,852 A * 12/1997 Iwanaga et al. ............ 523/201

FOREIGN PATENT DOCUMENTS

| JP | 2003 335807 | 11/2003 |
| JP | 2004-182943 | 7/2004 |
| JP | 2004-238562 | 8/2004 |
| JP | 2004 238562 | 8/2004 |
| JP | 2010-70899 | 4/2010 |
| JP | 2010 70899 | 4/2010 |

OTHER PUBLICATIONS

International Search Report Issued May 17, 2011 in PCT/JP11/57740 Filed Mar. 29, 2011.
Taiwanese Office Action issued Nov. 12, 2014, in Taiwan Patent Application No. 100110893 (with English translation).
Office Action issued Oct. 18, 2013 in Chinese Patent Application No. 201180017064.7 (Abridged English translation only).
Office Action issued Jun. 4, 2014 in Chinese Patent Application No. 201180017064.7 (Abridged English translation only).

* cited by examiner

*Primary Examiner* — Sheeba Ahmed
(74) *Attorney, Agent, or Firm* — Oblon, McClelland, Maier & Neustadt, L.L.P.

(57) ABSTRACT

To provide a copolymer latex having a small particle size, which has a sufficient adhesion strength as a binder and a low viscosity and excellent handling properties in a composition containing a filler and the like, a composition for coating paper using the copolymer latex, and a coated paper having a coating layer formed by the composition.

A copolymer latex contains a copolymer comprising: (A) 20 to 80% by mass of a structural unit derived from an aliphatic conjugated diene monomer, (B) 4 to 15% by mass of a structural unit derived from an unsaturated carboxylic acid monomer, and (C) 5 to 76% by mass of a structural unit derived from other copolymerizable monomer, wherein the total of (A), (B) and (C) being 100% by mass, and has a number average particle size of 30 to 80 nm by measurement with a transmission electron microscope, and has a viscosity of 50 to 400 mPa·s at a solid content of 48% by mass.

8 Claims, No Drawings

COPOLYMER LATEX AND COMPOSITION CONTAINING THE SAME AND APPLICATION PRODUCT THEROF

TECHNICAL FIELD

The present invention relates to a copolymer latex and a composition containing the same and an application product thereof, and more particularly to a copolymer latex having a large adhesion strength and excellent handling properties due to its low viscosity, and a composition containing the same and an application product thereof.

The copolymer latex of the present invention is suitably usable especially as a binder for various paints, especially compositions such as a coating composition of printing coated papers or a composition for forming electrodes of electrochemical devices.

BACKGROUND ART

Conventionally, in order to obtain a large adhesion strength when using a copolymer latex as a binder, there have been studied a method in which a molecular weight, degree of crosslinking, glass transition temperature and the like of a copolymer in the copolymer latex are optimized, and, in a copolymer latex used as a binder of a coating composition containing filler or the like, a method in which an adhesion strength is enhanced by downsizing the copolymer particles to thereby increase an effective adhesion area between the filler and copolymer particles.

For example, as a binder of a composition for paper coating used for production of coated papers, there has been known a copolymer latex having a small particle size is used for suppressing irregular flow of a coating liquid under a high shearing velocity (PTL 1 to PTL 6), and when using the copolymer latex having a small particle size, it is expected that the resulting adhesion strength is improved. However, since the copolymer latex having a small particle size has an extremely high viscosity, it is very difficult to be handled at a practical concentration unless a large amount of a viscosity reducing agent is used.

In contrast, a copolymer latex using a large amount of a viscosity reducing agent made it difficult to obtain practical performances as a binder, because of deteriorating of water resistance and the like. Therefore, although there are described in documents, the particle size of the copolymer latex actually in practical use is not made to be as small as having sufficient adhesion strength. A latex having sufficiently smaller particle size has not yet been practically used because of lowering of handling properties and other properties, or has had insufficient compatibility with other performances required as a binder.

In the technique disclosed in PTL 1, since it is impossible to improve both printing strength and blister resistance at the same time only by making a particle size of a copolymer in latex small, attention is focused on a gel content of the latex. However, the latex contains a large amount of surfactant used in its production, and thus the resulting coating layer by using the latex is considered to have insufficient wet pick strength.

PTL 2 discloses the use of a specific reactive emulsifier for producing stably a latex having a small particle size of 50 nm or less which is used for high speed coating, without using a large amount of an emulsifier. However in accordance with this production method, the resulting latex has high viscosity, and thus coating workability is not yet sufficient.

In PTL 3, there is disclosed a latex having a number average particle size of 80 nm or less. The technique in the Literature focuses attention on a contact angle of the latex in order to improve printing properties, and the Literature discloses use of a particular anionic surfactant for producing a latex having the specific contact angle.

In PTL 4, it is disclosed that a latex having an average particle size of 30 to 50 nm is produced by using a polymerization inhibitor in the pre-stage of two-stage polymerization, and the obtained latex is considered to have a high viscosity in view of monomer composition.

In PTL 5, there is disclosed a method for producing a latex having a number average particle size of 100 nm or less by continuous addition polymerization, and in this method, stability of the resulting latex is considered to have a certain problem because the amount of an acid monomer to be used is small.

In PTL 6, there is disclosed a process for producing a latex having a number average particle size of 60 nm or less by performing polymerization through the use of 2,4-dinitrochlorobenzen and under polymerization conditions in which the maximum value of an instantaneous polymerization rate is 10 to 45% by mass/hour, and in this method, the resulting latex is considered to have poor water resistance because the amount of an emulsifier to be used is large.

CITATION LIST

Patent Literature

PTL 1: Japanese Patent Laid-Open No. 08-188989
PTL 2: Japanese Patent Laid-Open No. 2003-119203
PTL 3: Japanese Patent Laid-Open No. 2008-248446
PTL 4: Japanese Patent Laid-Open No. 2005-343934
PTL 5: Japanese Patent Laid-Open No. 2004-59758
PTL 6: Japanese Patent Laid-Open No. 2003-335807

SUMMARY OF INVENTION

Technical Problem

The present invention has been made in view of the aforementioned problems included in the prior art, and the object of the present invention is to provide a small particle size copolymer latex which has sufficient adhesion strength as a binder and has a low viscosity and good handling properties in a practical concentration range in a composition containing a filler and the like.

Another object of the present invention is to provide a composition using the copolymer latex and application product thereof, specifically a composition for coating paper and a coated paper having a coating layer formed by the composition.

Solution to Problem

According to the present invention, there are provided a following copolymer latex and a composition and application product.

[1] A copolymer latex which contains a copolymer comprising: (A) 20 to 80% by mass of a structural unit derived from an aliphatic conjugated diene monomer, (B) 4 to 15% by mass of a structural unit derived from an unsaturated carboxylic acid monomer, and (C) 5 to 76% by mass of a structural unit derived from other copolymerizable monomer (wherein the total of (A), (B) and (C) being 100% by mass), and which has a number average particle size of 30 to 80 nm by measurement with a transmission electron microscope, and has a viscosity of 50 to 400 mPa·s at a solid content of 48% by mass.

[2] The copolymer latex, having, as the structural unit (C) derived from other copolymerizable monomer of the copolymer, 5 to 40% by mass of a structural unit derived from an α,β-unsaturated nitrile compound.
[3] The copolymer latex, having, as the structural unit (C) derived from other copolymerizable monomer of the copolymer, 5 to 40% by mass of a structural unit derived from an aromatic vinyl compound.
[4] The copolymer latex, wherein the number average particle size is 30 to 75 nm.
[5] The copolymer latex, wherein the viscosity is 80 to 400 mPa·s.
[6] A composition for coating paper comprising the aforementioned copolymer latex and a pigment.
[7] A coated paper having a coating layer obtained by coating and drying the aforementioned composition for coating paper.

Advantageous Effects of Invention

The copolymer latex of the present invention has, by being used as a binder, large adhesion strength, and excellent handling properties in a practical concentration range. Particularly, when being contained in a composition in which a filler such as a pigment or an active material is blended, the copolymer particle has a small particle size and has a large effective adhesion area, and thus the copolymer latex has strong adhesion force with the filler and has excellent adhesion force with a substrate too, which results in obtaining a durable coating film. Furthermore, the viscosity in a practical concentration range is low, and thus when coating on a substrate, a coating film having small disturbance thereon and a high surface smoothness can be obtained.

DESCRIPTION OF EMBODIMENTS

Hereinafter, the best mode for carrying out the present invention will be explained, but the present invention is not limited to the embodiments below. That is, optional modifications and improvements made by those skilled in the art based on their usual knowledge, without departing from the gist of the present invention, also fall within the scope of the present invention.

[1] Copolymer Latex

The copolymer latex of the present invention contains a copolymer comprising: (A) 20 to 80% by mass of a structural unit derived from an aliphatic conjugated diene monomer, (B) 4 to 15% by mass of a structural unit derived from an unsaturated carboxylic acid monomer, and (C) 5 to 76% by mass of a structural unit derived from other copolymerizable monomer, wherein the total of (A), (B) and (C) being 100% by mass, and has a number average particle size of 30 to 80 nm by measurement with a transmission electron microscope, and a viscosity of 50 to 400 mPa·s at a solid content of 48% by mass.

[1-1] Structure of Copolymer (A) Structural Unit Derived from an Aliphatic Conjugated Diene Monomer The structural unit (A) derived from an aliphatic conjugated diene monomer is a structural unit derived from an aliphatic conjugated diene monomer (a) when the aliphatic conjugated diene monomer (a) is copolymerized with an unsaturated carboxylic acid monomer (b) and other copolymerizable monomer (c), mentioned below.

Examples of the aliphatic conjugated diene monomer (a) include 1,3-butadiene, isoprene, 2,3-dimethyl-1,3-butadiene, 2-ethyl-1,3-butadiene, 2-methyl-1,3-butadiene, 1,3-pentadiene, chloroprene, 2-chloro-1,3-butadiene, cyclopentadiene, and the like. Among them, 1,3-butadiene is preferable. These conjugated diene monomers can be used alone or in combination of two or more of them. A content of the structural unit (A) derived from the aliphatic conjugated diene monomer (a) is 20 to 80% by mass, preferably 30 to 70% by mass relative to the total structural units. When the content of the structural unit derived from the aliphatic conjugated diene monomer is within the above range, the copolymer does not become too hard, and adherence properties do not also become too high, sufficient adhesion strength can be obtained, and also roll staining resistance is not deteriorated.

(B) Structural Unit Derived from an Unsaturated Carboxylic Acid Monomer

The structural unit (B) derived from an unsaturated carboxylic acid monomer is a structural unit derived from the unsaturated carboxylic acid monomer (b) when the unsaturated carboxylic acid monomer (b) is copolymerized with the aliphatic conjugated diene monomer (a) and other copolymerizable monomer (c).

Examples of the unsaturated carboxylic acid monomer (b) include monocarboxylic acids such as acrylic acid, methacrylic acid, and crotonic acid; dicarboxylic acids such as maleic acid, fumaric acid, and itaconic acid; half esters such as methyl maleate, methyl itaconate, and β-methacryloxyethyl acid hexahydrophthalate; potassium salts, sodium salts, ammonium salts thereof.

In the present description, the unsaturated carboxylic acid monomer (b) means a material including one which changes to an unsaturated carboxylic acid monomer during emulsion polymerization.

Examples of the material which changes to an unsaturated carboxylic acid monomer during emulsion polymerization include monocarboxylic anhydrides, dicarboxylic anhydrides, potassium salts, sodium salts, ammonium salts thereof, and the like. Specifically, since acrylic anhydride, maleic anhydride and the like change to the corresponding carboxylic acid in performing emulsion polymerization in an aqueous medium, they can be used as the unsaturated carboxylic acid monomer.

These unsaturated carboxylic acid monomers can be used alone or in combination of two or more of them. Among them, acrylic acid, itaconic acid, methacrylic acid and fumaric acid are preferable.

A content of the structural unit (B) derived from the unsaturated carboxylic acid monomer (b) is 4 to 15% by mass, preferably 4.5 to 14% by mass, more preferably 4.5 to 13% by mass relative to the total structural units. When the content of the structural unit derived from the unsaturated carboxylic acid monomer is within the above range, stability of the copolymer latex at the time of the emulsion polymerization is good and stability of mechanical properties of the coating liquid is good, and also, since a viscosity of the resulting copolymer latex does not become high, a viscosity of the coating liquid does not become high, and thus operability can be kept good during coating works.

(C) Structural Unit Derived from Other Copolymerizable Monomer

The structural unit derived from other copolymerizable monomer (c) in the copolymer is a structural unit derived from a monomer (c) which is copolymerizable with the aliphatic conjugated diene monomer (a) and the unsaturated carboxylic acid monomer (b), and which excludes monomers (a) and (b).

The other copolymerizable monomer (c) is a component used for imparting, mainly, an adequate hardness in accordance with the intended use and properties as paints, to the resulting copolymer.

As the other copolymerizable monomer (c), there can be included, for example, compounds having one or more polymerizable unsaturated bonds in a molecule. Examples thereof include aromatic vinyl compounds, α,β-unsaturated nitrile compounds, acrylic acid esters, methacrylic acid esters, alkyl esters of unsaturated dibasic acids, maleic acid anhydride, acrylamides, methacrylamides, vinyl esters, vinyl ethers, halogenated vinyls, basic monomers having amino group, vinyl pyridine, olefins, α,β-ethylenically unsaturated monomers having silicon atom, and the like.

Examples of the aromatic vinyl compounds include styrene, α-methylstyrene, o-methylstyrene, m-methylstyrene, p-methylstyrene, ethylstyrene, vinyltoluene, vinylxylene, bromostyrene, vinylbenzyl chloride, p-t-butylstyrene, chlorostyrene, alkylstyrene, divinylbenzene, trivinylbenzene, and the like. Among them, styrene and α-methylstyrene are preferable.

Examples of the α,β-unsaturated nitrile compounds include acrylonitrile, methacrylonitrile, α-chloromethacrylonitrile, and the like. Among them, acrylonitrile is preferable.

Examples of the acrylic acid esters and methacrylic acid esters include methyl (meth)acrylate, ethyl (meth)acrylate, propyl (meth)acrylate, n-butyl (meth)acrylate, t-butyl (meth)acrylate, isobutyl (meth)acrylate, n-amyl (meth)acrylate, isoamylhexyl (meth)acrylate, octyl (meth)acrylate, nonyl (meth)acrylate, decyl (meth)acrylate, dodecyl (meth)acrylate, octadecyl (meth)acrylate, cyclohexyl (meth)acrylate, phenyl (meth)acrylate, benzyl (meth)acrylate, 2-ethyl-hexyl (meth)acrylate, hydroxyethyl (meth)acrylate, hydroxypropyl (meth)acrylate, hydroxycyclohexyl (meth)acrylate, glycidyl (meth)acrylate, ethylene glycol di(meth)acrylate, 1,3-butylene glycol di(meth)acrylate, 1,4-butylene glycol di(meth)acrylate, propylene glycol di(meth)acrylate, 1,5-pentane diol di(meth)acrylate, neopentyl glycol di(meth)acrylate,1,6-hexane diol di(meth)acrylate, diethylene glycol di(meth)acrylate, triethylene glycol di(meth)acrylate, tetraethylene glycol di(meth)acrylate, polyethylene glycol di(meth)acrylate, polypropylene glycol di(meth)acrylate, pentaerythritol tri (meth)acrylate, trimethylolpropane tri(meth)acrylate, tetramethylolmethane tetra(meth)acrylate, allyl (meth)acrylate, methoxypolyethylene glycol (meth)acrylate, β-(meth)acryloyloxyethyl hydrogen phthalate, β-(meth)acryloyloxyethyl hydrogen succinate, 3-chloro-2-hydroxypropyl (meth)acrylate, stearyl (meth)acrylate, phenoxyethyl (meth)acrylate, phenoxypolyethylene glycol (meth)acrylate, 2-hydroxy-1,3-di(meth)acryloxypropane, 2,2-bis[4-((meth)acryloxyethoxy)phenyl]propane, 2,2-bis[4-((meth)acryloxy diethoxy)phenyl]propane, 2,2-bis[4-((meth)acryloxy polyethoxy)phenyl]propane, isobornyl (meth)acrylate, and the like. Among them, methyl (meth)acrylate is preferable.

Examples of the alkyl esters of unsaturated dibasic acids include crotonic acid alkyl esters, itaconic acid alkyl esters, fumaric acid alkyl esters, maleic acid alkyl esters, and the like.

Examples of the acrylamide and methacrylamides include (meth)acrylamide, N-methylol(meth)acrylamide, N-alkoxy (meth)acrylamide, and the like.

The other copolymerizable monomers (c) can be used alone or in combination of two or more of them.

A content of the structural unit (C) derived from the other copolymerizable monomer (c) is preferably 5 to 76% by mass, more preferably 20 to 70% by mass relative to the total structural units. When the content of the structural unit derived from the other copolymerizable monomer is within the above range, the resulting copolymer does not become too hard, and there is no risk of lowering the adhesion strength.

In the present invention, it is preferable to contain the structural unit derived from the aromatic vinyl compound as the structural unit (C) derived from the other copolymerizable monomer in an amount of 5 to 40% by mass, particularly preferably 10 to 40% by mass.

It is preferable to contain the structural unit derived from the α,β-unsaturated nitrile compound in an amount of 5 to 40% by mass, particularly 5 to 30% by mass.

In a case where the copolymer containing the structural unit derived from the α,β-unsaturated nitrile compound in the aforementioned range is used, for example, as a binder for coating paper, there is an advantage that oil resistance of the copolymer is improved and thus a printing gloss is further improved. Furthermore, in a case where the copolymer is used, for example, as a binder for forming an electrode of electrochemical devices, the copolymer properly swells by an electrolytic solution, to thereby enlarge the network structure, and the solvated ions easily passes and moves through this enlarged network structure, and thus an effect of improving the dispersion of ions, and the like is achieved.

[1-2] Number Average Particle Size of the Copolymer Latex

In the present description, the "number average particle size" is a number average particle size of the copolymer particles contained in the copolymer latex measured with a transmission electron microscope.

In the present invention, the copolymer particle of the copolymer latex has a number average particle size of 30 to 80 nm, preferably 30 to 75 nm, more preferably 30 to 70 nm, and particularly preferably 40 to 65 nm. A copolymer latex having a number average particle size of less than 30 nm becomes viscous and becomes difficult to be produced, and thus in the case of using the copolymer latex as a binder of compositions containing pigments, active materials or the like, the difficulty accompanies in dispersing the pigments or active materials uniformly. In addition, for example, in the case of using the copolymer latex as a binder of coating composition for coating paper, the smoothness of the resulting coating layer is reduced and printing properties such as printing gloss becomes lowered. In contrast, a copolymer latex having a number average particle size of more than 80 nm does not have excellent adhesion strength, and thus strength is lowered. A specific method of the measurement will be described in the following EXAMPLE.

[1-3] Viscosity of the Copolymer Latex

In the present invention, a viscosity of the copolymer latex having a solid content of 48% by mass is 50 to 400 mPa·s, preferably 80 to 400 mPa·s, particularly preferably 100 to 400 mPa·s.

When the viscosity of the copolymer latex is within the aforementioned range, excellent handling properties can be obtained at a practical concentration.

[1-4] Weight Average Molecular Weight of the Copolymer in the Copolymer Latex

In the copolymer latex, in a molecular weight distribution obtained by gel permeation chromatography (GPC), a weight average molecular weight of a component (α) (in polystyrene terms) of 1 million or less is 30,000 to 400,000, and preferably 40,000 to 200,000. When the weight average molecular weight of the copolymer latex is less than 30,000, excellent adhesion strength can not be obtained. In contrast, when the copolymer latex having a weight average molecular weight of more than 400,000 gives excellent adhesion strength, but the copolymer latex has high viscosity and the obtained coating liquid becomes viscous and coating works would be difficult.

The "weight average molecular weight" is a weight average molecular weight of a component (α) of 1 million (in polystyrene terms) or less among components contained in the copolymer latex, in a molecular weight distribution obtained by GPC, and specifically means a weight average molecular weight of a component (α) of 1 million (in polystyrene terms) or less, in a molecular distribution obtained by GPC measured under the following conditions. The weight average molecular weight of the copolymer latex can be controlled by regulating polymerization temperature, amounts and types of molecular weight modifier and polymerization initiator, and the like.

A specific method of the measurement of the weight average molecular weight will be described in the following EXAMPLE.

[1-5] Gel Content of the Copolymer Latex

The "gel content" is a gel content of the components contained in the copolymer latex and includes a THF gel content and a toluene gel content, and both contents are preferably 50 to 98%.

The "THF gel content" is a ratio of the components exhibiting a weight average molecular weight Mw (hereinafter referred to as "Mw") of 1 million or more, in polystyrene terms, obtained from GPC chart, measured under the following conditions, that is, in a chromatogram in which the ordinate indicates detected amount and the abscissa indicates elution time, a ratio of a peak area detected before the elution time when the molecular weight corresponds to 1 million, relative to an area encompassed by a elution curve and the abscissa.

A copolymer latex having a THF gel content of less than 50% gives insufficient strength and furthermore has a large adhesiveness, which results in lowering roll resistance. When the THF gel content is more than 98%, sufficient strength cannot be obtained.

The "toluene gel content" means a percentage of components which cannot be dissolved in toluene in the copolymer latex. In the present invention, a toluene gel content is not particularly limited and can be adjusted to the most suitable value depending on the intended use. For example, in the case where the copolymer latex of the present invention is used as a binder of coating composition of coating paper for printing, when the toluene gel content is less than 50%, the obtained coating film has insufficient strength and has a large adhesiveness, resulting in lowering roll resistance, and when a toluene gel content is more than 98%, the resulting coating film does not have a sufficient strength.

[2] Production Method of the Copolymer Latex

In the production method of the copolymer latex, the conjugated diene monomer (a), the unsaturated carboxylic acid monomer (b), and the other copolymerizable monomer (c) are prepared at the above-described predetermined rates, and through the adoption of batch-polymerization, it is preferable to feed 70% by mass or more of total amount of the unsaturated carboxylic acid monomer (b) to be used at the initial feeding stage of the polymerization, and to cause them to react from the initial stage of the polymerization.

In the polymerization of the monomers, the copolymer latex may be produced by seed polymerization through the use of previously prepared seed latex at the initial feeding stage.

[2-1] Polymerization Initiator

The copolymer latex of the present invention can be obtained by emulsion-polymerizing the aforementioned monomer components. The polymerization initiator to be used is a compound which is radically decomposed by heating or in the presence of a reducing agent, to addition-polymerize the monomers, and any of inorganic and organic polymerization initiators such as persulfate, peroxide, and an azobis compound can be used. Examples of the polymerization initiator include sodium persulfate, potassium persulfate, ammonium persulfate, cumene hydroperoxide, diisopropylbenzene hydroperoxide, paramenthane hydroperoxide, 2,2-azobisisobutilonitrile, and the like.

In the present invention, a redox polymerization in which a reducing agent is combined with the polymerization initiator can be employed. Examples of the reducing agent include erythorbic acid, sodium erythorbate, potassium erythorbate, ascorbic acid, sodium ascorbate, potassium ascorbate, sugars, Rongalit sodium formaldehyde sulfoxylate, sodium bisulfite, potassium bisulfite, sulfites such as sodium sulfite and potassium sulfite, sodium pyrobisulfite, potassium pyrobisulfite, pyrosulfites such as sodium pyrosulfite and potassium pyrosulfite, sodium thiosulfate, potassium thiosulfate, phosphites such as phosphorous acid, sodium phosphite, potassium phosphite, sodium biphosphite and potassium biphosphite, pyrophosphites such as pyrophosphorous acid, sodium pyrophosphite, potassium pyrophosphite, sodium bipyrophosphite and potassium bipyrophosphite, mercaptan, and the like.

An amount of the polymerization initiator used is usually 0.6 to 2 parts by mass relative to 100 parts by mass of the monomers, and an amount of the reducing agent is 0 to 1 part by mass relative to 100 parts by mass of the monomers.

As the methods for adding the polymerization initiator and the reducing agent, there can be included a method in which they are added continuously into a polymerization system through different feeding pipes from each other at the same time, a method in which, into a polymerization system where the whole of the polymerization initiator and a part of the reducing agent are present, there is added the remaining reducing agent, by using at least one of batch-wise method and continuous method, a method in which, into a polymerization system where the whole of the reducing agent and a part of the polymerization initiator are present, there is added the remaining polymerization initiator, by using at least one of batch-wise method and continuous method, and the like. Among them, the method is preferable in which, into a polymerization system where the whole of the polymerization initiator and a part of the reducing agent are present, there is added the remaining reducing agent, by using at least one of batch-wise method and continuous method. In accordance with this method, it is possible to prevent the temperature of the polymerization system from drastically increasing, through a reaction heat generated by the fact that the reaction proceeds at once. Here, the batch-wise method means making separations a plurality of times, and the continuous method means maintaining a given amount within a given period of time.

The copolymer latex may also be obtained by carrying out emulsion polymerization under the presence of an oxidation-reduction catalyst, in addition to the polymerization initiator and the reducing agent. Examples of the oxidation-reduction catalyst may include metal catalysts, and the like. Examples of the metal catalyst include iron divalent ion, iron trivalent ion, copper ion, and the like.

As the methods for adding the oxidation-reduction catalyst into the polymerization system, there can be included a batch-wise method, continuous method, combination thereof, and the like. When using the radical catalyst, reducing agent and oxidation-reduction catalyst, it is preferable to use potassium persulfate as the radical polymerization catalyst, sodium bisulfite as the reducing agent, and ferrous sulfate as the oxidation-reduction catalyst.

[2-2] Emulsifier

The emulsifier may include an anionic surfactant, a nonionic surfactant, an ampholytic surfactant, and the like. These may be used alone or in combination of two or more of them.

Examples of the anionic surfactants include sulfate esters of higher alcohols, alkylbenzene sulfonates, aliphatic sulfonates, sulfate esters of polyethylene glycol alkyl ethers, and the like.

Examples of the nonionic surfactants can include those of alkyl ester types, alkyl ether types or alkyl phenyl ether types of polyethylene glycol, and the like.

The ampholytic surfactant can include, for example, one containing, as an anionic part, a carboxylate, a sulfate ester salt, a sulfonate or a phosphate ester salt, and containing, as a cationic part, an amine salt or a quaternary ammonium salt. Specific examples of the ampholytic surfactants include betaines such as lauryl betaine and stearyl betaine; amino acid-type surfactants such as lauryl-β-alanine, stearyl-β-alanine, lauryl di(aminoethyl)glycin or octyl di(aminoethyl)glycin, and the like. Among these emulsifiers, the alkylbenzene sulfonic acid salt is preferable, and sodium dodecylbenzene sulfonate is more preferable.

The amount to be used of the emulsifier is preferably 0.5 to 5 parts by mass, and more preferably 0.5 to 4 parts by mass relative to 100 parts by mass of the monomers. When the amount of the emulsifier used is less than 0.5 parts by mass, there is a risk that polymerization stability is lowered and aggregation takes place. In contrast, when the amount is more than 5 parts by mass, there is a risk that, in using the resulting copolymer latex as a binder, handling properties become deteriorated because of marked foaming. The emulsifier may be added to the polymerization system in a batch-wise manner, in a continuous manner, or in combination thereof.

[2-3] Molecular Weight Modifier

Examples of the molecular weight modifiers include mercaptans such as n-hexylmercaptan, n-octylmercaptan, n-dodecylmercaptan, t-dodecylmercaptan, n-hexadecylmercaptan, n-tetradecylmercaptan, t-tetradecylmercaptan and thioglycolic acid; xanthogen disulfides such as dimethylxanthogen disulfide, diethylxanthogen disulfide and diisopropylxanthogen disulfide; thiuram disulfides such as tetramethylthiuram disulfide, tetraethylthiuram disulfide and tetrabutylthiuram disulfide; halogenated hydrocarbons such as chloroform, carbon tetrachloride, carbon tetrabromide and ethylene bromide; hydrocarbons such as pentaphenylethane and α-methylstyrene dimer; acrolein, methacrolein, allyl alcohol, 2-ethylhexyl thioglycolate, terpinolene, α-terpinene, γ-terpinene, dipentene, 1,1-diphenylethylene, and the like. Among them, mercaptans, xanthogen disulfides, thiuram disulfides, 1,1-diphenylethylene, α-methylstyrene dimer are preferable. These can be used alone or in combination of two or more of them.

The amount of the emulsifier to be used is preferably 0 to 20 parts by mass, more preferably 0.05 to 15 parts by mass, and particularly preferably 0.1 to 10 parts by mass relative to 100 parts by mass of the monomer components. When the amount of the emulsifier used is more than 20 parts by mass, there is a risk that the adhesion strength becomes lowered. The molecular weight modifier can be added collectively or added to the polymerization system in a batch-wise manner, in a continuous manner, or in combination thereof.

[2-4]

The copolymer latex of the present invention has both properties of small particle size and low viscosity.

As mentioned as to the prior patent literature, production of the copolymer latex having a small particle size has been studied, and making a particle size smaller has been achieved. However, there is not known a technique in which the phenomenon that the viscosity of the latex becomes large by downsizing the particle size of the copolymer latex has been overcome. In the present invention, the copolymer latex having a small particle size and low viscosity has been obtained for the first time, by using the amount of the unsaturated carboxylic acid larger than that in the prior art, and further by reacting the unsaturated carboxylic acid monomer at the initial polymerization stage, and by decreasing a gel content at the initial polymerization stage. In accordance with this method, presumably, this is because such a structure in which a polymer portion derived from the water-soluble monomer is grafted to the polymer particle is formed.

In the present invention, the initial polymerization stage means a stage before 50% by mass or less of monomers in the whole monomers to be copolymerized are polymerized.

[3] Polymer Solid Content

A polymer solid content of the copolymer latex prepared by the aforementioned production method is 15 to 55% by mass, more preferably 20 to 50% by mass, and particularly preferably 25 to 50% by mass. When the polymer solid content is 15% by mass or less, productivity is low and is not preferable from industrial point of view. In contrast, when the polymer solid content is more than 55% by mass, removal of heat generated at the time of polymerization becomes difficult.

[4] Other Additives and the Like

The emulsion polymerization for obtaining the copolymer latex of the present invention can be carried out by further adding various polymerization controlling agents such as a pH adjusting agent and various chelating agent.

Moreover, if necessary, the pH adjusting agent and the viscosity adjusting agent may be added to the copolymer latex of the present invention. Examples of the pH adjusting agent include sodium hydroxide, potassium hydroxide, ammonium hydroxide, sodium bicarbonate, sodium carbonate, disodium hydrogen phosphate, and the like. Examples of the chelating agent include sodium ethylenediaminetetraacetate, and the like.

The type of the viscosity adjusting agent is not particularly limited, and can include, for example, various water soluble polymers, casein, modified caseins, starch, modified starches, and the like. Among them, examples of the water soluble polymers include water soluble polymers such as polycarboxylic acid-based, polyether-based, modified polycarboxylic acid-based, urethane-modified polyether-based, modified polyacrylic and associated polyacrylic water soluble polymers; polyvinyl alcohol; carboxymethyl cellulose; and the like. These may be used alone or in combination of two or more of them.

An amount of the viscosity adjusting agent is 0.01 to 3 parts by mass, preferably 0.01 to 2.5 parts by mass, more preferably 0.01 to 2 parts by mass relative to 100 parts by mass of the solid of the copolymer latex.

[5] Use Application

The copolymer latex of the present invention is useful as a binder for particles, powders or fillers of metals, inorganic compounds, ceramics, pigments, fluorescent materials, glasses, and the like.

Particularly, the copolymer latex can be suitably used as a binder of paper coating compositions, and a binder of compositions for forming electrodes of electrochemical devices such as batteries, capacitors and lithium ion capacitors.

[6] Paper Coating Compositions

A paper coating composition contains a copolymer latex and a pigment.

The pigment included in the paper coating composition may be either an inorganic pigment or an organic pigment. Examples of the inorganic pigment can include calcium carbonate, barium sulfate, titanium oxide, satin white, talc, aluminum hydroxide, zinc oxide, and the like. Among them, calcium carbonate is preferable because of a low price and allowing the lowering of coating liquid cost. Examples of the organic pigment can include polystyrene latex, urea-formalin resin, and the like. These can be used alone or in combination of two or more of them, depending on the purpose.

In the paper coating composition, a content of calcium carbonate contained in the pigment is 20% by mass or more, preferably 30 to 100% by mass, particularly preferably 40 to 100% by mass.

In the paper coating composition of the present invention, the calcium carbonate has a weight average particle size of preferably 0.3 to 2.0 μm, more preferably 0.4 to 1.5 μm, particularly preferably 0.5 to 1.0 μm. When the weight average particle size of the calcium carbonate is less than 0.3 μm, there is a risk that the strength of the coating film is lowered and that the printing gloss becomes lowered because the absorption of ink becomes fast. Meanwhile, when the weight average particle size of the calcium carbonate is more than 2.0 μm, there is a risk that the printing gloss becomes lowered because the smoothness of the coating film becomes deteriorated.

In the calcium carbonate, a content of coarse large particles having a particle size larger than 2.0 μm is preferably 10% by mass or less, more preferably 0 to 9% by mass, and particularly preferably 1 to 8% by mass. When using a calcium carbonate containing the coarse large particles in an amount of more than 10% by mass, there is a risk that the strength and printing gloss of the obtained coating film become lowered.

The pigment in the paper coating composition preferably contains hollow polymer particles. When using the pigment containing the hollow polymer particles, the obtained coating film achieves the effects of improving smoothness, and further improving the printing gloss. Here, the "hollow polymer particle" means a polymer particle having a cavity inside the polymer layer.

A weight average particle size of the hollow polymer particle is preferably 50 to 10000 nm, more preferably 100 to 8000 nm, and particularly preferably 200 to 6000 nm.

Furthermore, a hollow volume ratio of the hollow polymer particle is preferably 20 to 80%, more preferably 25 to 75%, and particularly preferably 30 to 70%. Here, the "hollow volume ratio" means a value calculated by measuring an outer diameter and an inner diameter through the use of a transmission electron microscope.

Moreover, the hollow polymer particle is preferably obtained by polymerizing at least one monomer selected from the group consisting of aromatic vinyl compounds, acrylic acid esters and methacrylic acid esters. The hollow polymer particle may have crosslinking structure.

Furthermore, for maintaining the hollow structure, a glass transition temperature of the hollow polymer particle is preferably 25° C. or higher, more preferably 30° C. or higher, and particularly preferably 40° C. or higher.

The paper coating composition may further contain, as necessary, glues and other aids in addition to the copolymer latex and pigment.

Examples of the glue include natural glues such as starch, oxidized starch, soy bean protein and casein; synthesized latex such as polyvinyl alcohol, polyvinyl acetate latex and acrylic latex; water soluble materials such as carboxymethyl cellulose. Among them, starch is preferable.

Examples of the aid can include dispersants, antifoaming agents, leveling agents, antiseptic agents, water resistive agents, parting agents, fluorescent dyes, color retention-improving agents, pH adjusting agents, and the like.

Examples of the dispersant include sodium pyrophosphate, sodium hexamethaphosphate, and the like. Examples of the antifoaming agent include polyglycols, fatty acid esters, phosphate esters, silicone oils, and the like. Examples of the levering agent include turkey red oils, dicyanamides, urea, and the like. Examples of the water resistive agent include formalin, hexamine, melamine resin, urea resin, glyoxal, and the like. Examples of the parting agent include calcium stearate, paraffin emulsion, and the like. Examples of the color retention-improving agent include carboxymethyl cellulose, sodium alginate, and the like.

In the paper coating composition of the present invention, a solid content of the copolymer latex is 3 to 25 parts by mass relative to 100 parts bay mass of the pigment, preferably 4 to 20 parts by mass, and more preferably 5 to 15 parts by mass.

The paper coating composition of the embodiments can be prepared by mixing the aforementioned copolymer latex, pigment, and as necessary, the additives, each in a given amount.

[7] Coated Paper

The coated paper which is one embodiment of the present invention has a base paper and coating layers obtained by coating the coating liquid containing the paper coating composition of the present invention, to the both sides of the base paper.

The coated paper of the present invention is excellent in dry-pick strength, wet-pick strength, printing gloss, and blister resistance, because of having the coating layer formed by the coating liquid prepared from the paper coating composition containing the copolymer latex of the present invention.

The coated paper of the present invention can be particularly suitably used for sheet-fed offset printing and rotary offset printing. Furthermore, it can also be used for other printings, e.g. planographic printing, intaglio printing such as gravure printing, and relief printing.

The base paper to be used for the coated paper is not particularly limited, and can be used by selecting optionally types of pulps, paper making methods, paper making machines, from conventionally known techniques. A basis weight is, for example, preferably within a range of from 30 to 200 g/m$^2$ which is used for general printing, more preferably from 30 to 150 g/m$^2$. The base paper making method may be any of an acid paper making method, a neutral paper making method, or an alkaline paper making method, through the use of a fourdrinier former, twin-wire former of gap-type, hybrid former in which the back side of the fourdrinier portion is constructed with the twin-wire, and the like. Furthermore, as the base paper, there can be used a medium-grade base paper containing mechanical pulp, and a base paper containing used paper pulp, and an upper-grade base paper.

Since the coating layers of the coated paper of the present invention are obtained by coating the coating liquid of the paper coating composition of the present invention to the both sides of the base paper, the coated paper of the present invention is excellent in dry-pick strength, wet-pick strength, printing gloss, and blister resistance.

The coating liquid is based on the paper coating composition of the present invention, and has a solid content of preferably 30 to 80% by mass, more preferably 35 to 78% by mass, and particularly preferably 40 to 75% by mass. When the solid content of the coating liquid is less than 30% by mass, there is a risk that the printing gloss becomes lowered because the smoothness of the coating film obtained becomes reduced. In contrast, when the solid content of the coating liquid is more than 80% by mass, there may cause an obstacle in coating works because fluidity is not sufficient at a high speed coating.

The coating method of the coating liquid is not particularly limited, and the conventionally known methods can be employed. The known methods can include air blade method, blade coater method, film transfer method (i.e. roll coater method), bar coater method, curtain coater method, die rod coater method, and the like. Among them, the blade coater method or the film transfer method is preferable.

In the coating paper, it is preferable to form one or more coating layers on one side of the base paper. When forming two or more coating layers on each of the both sides of the base paper, a coating machine to be used for the under coating is preferably one in accordance with the blade coater method or the film transfer method, and a coating machine to be used for the upper coating is preferably one in accordance with the blade coater method. Meanwhile, after coating the coating liquid on the both sides, any desired finishing treatment by such as super calendar, soft calendar, or the like may be applied.

[8] Compositions for Forming Electrodes of Electrochemical Devices

As the active materials used in the electrodes, the most suitable materials can be used depending on the types of battery devices.

In the case of lithium ion secondary battery, any negative electrode active material and positive electrode active material used for production of a usual lithium ion secondary battery can be employed.

As the negative electrode active material of the lithium ion secondary battery, there are exemplified carbon materials such as amorphous carbon, graphite, natural graphite, methocarbon micro beads (MCMB), and pitch-based carbon fiber; electrically conductive polymer such as polyacene; composite metal oxide of the formula $A_xB_yO_z$ (wherein A is an alkali metal or a transition metal, B is at least one selected from transition metals such as cobalt, nickel, aluminum, tin and manganese, O is oxygen atom, X, Y and Z are numerals in the ranges of $1.10>X>0.05$, $4.00>Y>0.85$, $5.00>Z>1.5$); and other metal oxides.

Examples of the positive electrode active material of the lithium ion secondary battery include transition metal oxides such as $TiS_2$, $TiS_3$, amorphous $MoS_3$, $Cu_2V_2O_3$, amorphous $V_2O$—$P_2O_5$, $MoO_2$, $V_2O_5$ and $V_6O_{13}$, lithium-containing composite metal oxides such as $LiCoO_2$, $LiNiO_2$, $LiMnO_2$ and $LiMn_2O_4$. Furthermore, there can also be used organic compounds such as electrically conductive polymers such as polyacetylene and poly(p-phenylene).

In the case of nickel-hydrogen secondary battery, any electrode active materials used in a usual nickel-hydrogen secondary battery can be used, and as a negative electrode active material, hydrogen storing alloy can be used. As a positive electrode active material, there can be used nickel oxyhydroxide, nickel hydroxide, and the like.

In the compositions for forming electrodes of electrochemical devices, an amount of the copolymer latex is, relative to 100 parts by weight of active material, usually 0.2 to 2 parts by weight, preferably 0.5 to 1.2 parts by weight, in terms of solid content, for a positive electrode active material, and usually 0.3 to 3 parts by weight, preferably 0.5 to 1.8 parts by weight, in terms of solid content, for a negative electrode active material.

In the composition for electrodes, an electrical conductivity-imparting agent to be added as necessary, there are used carbons such as graphite and active carbon in the lithium ion secondary battery, and there can be included, in nickel-hydrogen secondary battery, cobalt oxide for a positive electrode, and nickel powder, cobalt oxide, titanium oxide, carbon, or the like for a negative electrode.

In the both batteries as above, examples of the carbon include acetylene black, furnace black, graphite, carbon fiber, fullerenes, and the like. Among them, acetylene black and furnace black are preferable.

An amount of the electrical conductivity-imparting agent is usually 1 to 20 parts by weight, preferably 2 to 10 parts by weight relative to 100 parts by weight of the active material.

EXAMPLES

Hereinafter, the present invention will be explained in detail by referring Examples, but is not limited to the Examples. Meanwhile, in Examples and Comparative Examples, "part" and "%" are based on mass, unless otherwise noted.

In Examples and Comparative Examples, each evaluation was carried out in accordance with the following method.
(Evaluation Method)
(Evaluation Methods of Copolymer Latex Physical Properties)
(1) Toluene Gel Content A film was prepared by drying a copolymer latex through the use of a hot air dryer of 130° C., for 30 minutes. There was weighted 0.3 g of the obtained film, to be a sample film, and the sample film was immersed in 100 ml of toluene for 2 hours with stirring. After that, the toluene solution was recovered by filtration with filter paper. By evaporating the obtained toluene solution, a weight of the film material dissolved in toluene was measured. A toluene gel content of the copolymer latex was obtained by the division of a differential calculated through the subtraction of the film material dissolved in toluene from the weight of the sample film, by the weight of the sample film.

(2) THF Gel Content at Polymerization Conversion Rate of 50%

In a polymerization of copolymer latex, a part of the copolymer latex was taken out to be a sample at the time when 50% of total monomers to be copolymerized were polymerized.

To 0.2 g of the sample copolymer latex having been adjusted to be a solid content of 20% by mass, there was added about 1 g of a cationic ion exchange resin having been washed and rinsed with water in accordance with the conventional method, and cations were removed. Thereafter, 20 ml of tetrahydrofuran (THF) was added and the sample was dissolved by being allowed to stand for 24 hours. Then, filtration with a membrane filter of polytetrafluoroethylene (pore size 3 μm, produced by ADVATEC) was conducted, and the obtained filtrate was used as a sample to be measured.

In the measurement, a calibration curve previously prepared by using a polystyrene standard material having a known molecular weight was made use of. As a measuring devise, "HLC-8220 (Trade Name)" (produced by TOSO) was used, as a column, an organic solvent-type GPC column "TSKgel GMHHR-H (30) (Trade Name)" (packing agent; polystyrene gel, particle size; 30 μm, column size; 7.8 mm I.D.×300 mm produced by TOSO) was used, as a detector, a differential refractometer was used, as a solvent, tetrahydrofuran was used, and measurement was carried out under the conditions of a temperature of 40° C., a flow rate of 1 ml/minute, an injection amount of 100 μl. A THF gel content at a polymerization conversion rate of 50% was calculated from the obtained chromatograph.

(3) Number Average Particle Size

A sample to be measured was prepared by diluting 40 μl of copolymer latex having been adjusted to be a solid content of 48% by mass with 100 g of water, putting the diluted solution on a collodion-supporting membrane reinforced by carbon, staining the solution with osmic acid, and drying it over one night. This sample to be measured was observed through the use of an electron microscope H-7650 of HITACHI HIGHT-ECHNOLOGIES, the sizes of the copolymer latex particles in a photograph taken randomly at 30000 magnitudes was measured, and then a number average particle size of 300 particles was obtained.

(4) Viscosity of Latex

A viscosity of copolymer latex was measured by regulating a temperature of the copolymer latex to 25.0° C.±0.5° C., and then measuring the viscosity at 60 rpm for 1 minute through the use of RB80 Type Viscometer produced by TOKI SANGYO.

(5) Weight Average Molecular Weight

To 0.2 g of the sample copolymer latex adjusted by pure water so as to be a solid content of 20% by mass, 1 g of a cationic ion exchange resin washed and rinsed with water in accordance with a conventional method was added and cations were removed, and then 20 ml of tetrahydrofuran was added and the sample was dissolved by being allowed to stand for 24 hours. After that, filtration through the use of a membrane filter of polytetrafluoroethylene (pore size 3 μm, produced by ADVATEC) was conducted, and the obtained filtrate was used as a sample to be measured.

In the measurement, a calibration curve previously prepared by using a polystyrene standard material having a known molecular weight was made use of. As a measuring devise, "HLC-8220 (Trade Name)" (produced by TOSO) was used, as a column, an organic solvent-type GPC column "TSKgel GMHHR-H (30) (Trade Name)" (packing agent; polystyrene gel, particle size; 30 μm, column size; 7.8 mm I.D.×300 mm produced by TOSO) was used, as a detector, a differential refractometer was used, as a solvent, tetrahydrofuran was used, and measurement was carried out under the conditions of a temperature of 40° C., a flow rate of 1 ml/minute, and an injection amount of 100 μl.

(Binder Evaluation Methods)

(6) Roll Stain Resistance

In order to evaluate roll stain resistance, an adhesive test was carried out with respect to the copolymer latex. Specifically, after coating the copolymer latex on a polyethylene terephthalate film by No. 18 coating rod, a coating film of 10 g/m² was formed by drying at 120° C. for 30 seconds. Next, the coating film and a filter paper were overlapped and subjected to labsuper calendar treatment under a line pressure of 200 kg/m and a temperature of 65 to 145° C., and the coating film and the filter paper were pressure-bonded. After that, by peeling off the filter paper, the amount of the filter paper transferred on the coating film was evaluated with naked eyes, by using the 5-score method. When the degree of the transfer is lower, the point is higher. The evaluation results show an average value represented by the 6 measurement times.

(7) Dry-Pick Strength

As one example of indexes representing adhesion strength of a coating film formed from a coating composition containing filler and the like, a printing coated paper was prepared and its dry pick strength was evaluated.

(Preparation of Coating Composition for Printing Coated Paper)

A coating composition for printing coated paper having a total solid content of 65% was prepared by using 5 parts of a copolymer latex, 50 parts of kaolin clay (Trade Name "MGJ", produced by BASF), 50 parts of calcium carbonate (Trade name "KAHBITAL 90", produced by IMERYS), 0.025 part of polyacrylate-based dispersant (Trade Name "Aron T-50", produced by TOAGOSEI) as a dispersant, 0.05 part of sodium hydroxide (Trade Name "Sodium hydroxide first class", produced by WAKO PURE CHEMICAL INDUSTRIES), and 3 parts of starch (Trade Name "OJI ACE C", produced by OJI CORNSTARCH).

(Preparation of Coated Paper and Measurement of Dry Pick Strength)

To the both sides of a base paper (80.5 g/m²), the coating composition was coated by using a lab-blade coater so that a coating amount on one side was 13.5±0.5 g/m², and then dried by a hot air for 5 seconds at 150° C., and then, allowed to stand over a whole day and night in a constant temperature and humidity room, at a temperature of 23° C. and a humidity of 50%. Next, a coated paper was obtained by being subjected to super calendar treatment four times under the conditions of a line pressure of 100 kg/m and a roll temperature of 50° C. After that, the obtained coated paper was printed by using a test ink (Special ink, SMX 10-25, produced by TOYO INK) through the use of an RI Printing machine (AKIRA SEI-SAKUSHO), and the degree of picking strength was determined with naked eyes. Evaluation was performed using 5-score method, and when the picking phenomenon is lower, the point is higher. The evaluation results show an average value represented by the 6 measurement times.

(Preparation of Composition for Forming Electrode of Electrochemical Device)

A biaxial planetary mixer ("TK High Bis Mix 2P-03", produced by PRI MIX), was charged with 1 part, in terms of solid content, of a thickener "CMC2200" produced by DAICEL, 100 parts by solid conversion of graphite as a negative electrode active material, and 68 parts of water, and then stirred at 60 rpm for 1 hour. After adding 1 part by solid conversion of the copolymer latex and 34 parts of water, they were mixed with stirring at 200 rpm for 2 minutes and at 1800 rpm for 5 minutes in this order by using a defoaming mixer (Trade Name "AWATORI RENTARO", produced by THINKY). Thereafter, mixing with stirring was carried out under vacuum at 1800 rpm for 1.5 minutes to obtain a composition for forming electrode of electrochemical device.

(Production of Electrode Plate Material)

A current collector made of rolled copper foil (TCU-H20-RT-300-200-W, produced by NIPPON SEIHAKU) was set on an auto-film applicator (produced by Yasuda), and after a clearance of the applicator was adjusted to 50 μm, the composition for forming electrode of electrochemical device was coated at a speed of 10 cm/s. After that, it was dried with a dryer (DRYING OVEN, produced by SANYO) at 70° C. for 20 minutes, and further dried for 20 minutes at 120° C. After drying, by pressing through the use of a compact press machine (produced by TESTOR SANGYO) at a roll temperature of 30° C., an electrode plate material having an electrode layer thickness of about 60 μm and a density of 1.5 was obtained.

(8) Peeling Strength of Electrode Layer:

A test piece of 2 cm width and 12 cm length was cut out from the electrode plate material, and the surface of the electrode layer side of the test piece was attached to an aluminum plate by a double-coated adhesive tape. Furthermore, to the surface of the current collector of the test piece, an adhesive tape of 18 mm width (Trade name "CELLO TAPE" (registered trademark), produced by NICHIBAN, specified in JIS Z1522) was attached. Values of strength (mN/2 cm) when peeling the tape in the direction of 90 degrees at a speed of 50 mm/minute were measured 6 times, and the average value was calculated as the peeling strength (mN/2 cm). Meanwhile, when the peeling strength is larger, the adhesion strength between the current collector and the electrode layer is higher, which can be evaluated so that the electrode layer is hard to be peeled off from the current collector.

(9) Press Processability of Electrode Layer

The electrode plate material produced in the same manner as above was subjected to press in the direction of thickness at a load of 500 kg/cm through the use of a compact press machine (produced by TESTOR SANGYO), and the status of peeling and breakdown appearance of the electrode layer were observed with naked eyes. When the peeling and breakdown of the electrode layer were very little, it was evaluated as "A", when fine and partial peeling and breakdown of the electrode layer were observed, it was evaluated as "B", when the wholly and almost peeling and breakdown of the electrode layer were observed, it was evaluated as "C".

EXAMPLE

Synthesis Example of Seed Latex

Into a thermo-controllable autoclave provided with a stirrer, there were added 290 parts of water, 12 parts of sodium dodecylbenzenesulfonate, 0.5 part of α-methylstyrene dimer, and after elevating the temperature of the autoclave to 85° C., 10 parts of styrene, 0.5 part of acrylic acid, and 0.5 part of potassium persulfate were added and a polymerization was initiated.

After 1 hour from the initiation of polymerization, there was continuously added a mixture of 59.5 parts of styrene, 30 parts of methyl methacrylate, 0.5 part of t-dodecylmercaptan and 0.5 part of α-methylstyrene dimmer having been previously mixed in other vessel, at a constant rate for 3 hours. During the polymerization, every 1 hour, 0.1 part of potassium persulfate was added and the reaction was continued. Then, the reaction was stopped by being cooled to normal temperature at the time when the polymerization conversion rate reached 98% or more. Next, by addition of sodium hydroxide solution to the reaction liquid and by adjustment of a pH of the polymerization solution to 4.5, the seed latex having a number average particle size of 25 nm was obtained.

Synthesis Example 1

Production of Copolymer Latex L1

Into a thermo-controllable autoclave provided with a stirrer, there were added 224 parts of water, 10 parts, in terms of solid content, of the seed latex synthesized as above, 0.95 part of sodium dodecylbenzenesulfonate, 1.3 parts of potassium persulfate, and the components for the first stage as mentioned in TABLE 1, and after elevating the temperature of the autoclave to 50° C., 0.04 part of sodium bisulfite and 0.0012 part of ferrous sulfate 7-hydrate were added and a polymerization was initiated.

At 0.75 hours after the initiation of polymerization, the temperature was elevated to 60° C., and there were continuously added the monomer mixture liquid for the second stage as mentioned in TABLE 1, and an aqueous solution made up of 5.0634 parts of water and 0.1566 part of sodium bisulfite prepared previously in other vessel, at a constant rate for, respectively, 4.75 hours and 7.25 hours.

From 5.5 hours after the initiation of polymerization, the monomer mixture liquid for the third stage as mentioned in TABLE 1 was added continuously at a constant rate for 2.5 hours.

At 8 hours after the initiation of polymerization, the temperature was elevated to 63° C. and the polymerization was continued as is, and the polymerization was stopped by cooling to normal temperature at the time when the polymerization conversion rate reached 98-100%.

The obtained copolymer latex was adjusted to pH 7 with sodium hydroxide, 1.5 parts of sodium polyacrylate (ARON T-50 (TOA GOSEI)) was added, the unreacted monomers were removed by steam stripping method, evaporation was carried out under a reduced pressure, and the solid content was adjusted to 48% to obtain Copolymer Latex L1.

Synthesis Example 2

Production of Copolymer Latex L2

Into a thermo-controllable autoclave provided with a stirrer, there were added 224 parts of water, 2.4 parts of sodium dodecylbenzenesulfonate, 1.3 parts of potassium persulfate, and the components for the first stage as mentioned in TABLE 1, and after elevating the temperature of the autoclave to 50° C., 0.04 part of sodium bisulfite and 0.0012 part of ferrous sulfate 7-hydrate were added, and a polymerization was initiated.

At 0.75 hour after the initiation of polymerization, the temperature was elevated to 60° C., and there were continuously added the monomer mixture liquid for the second stage as mentioned in TABLE 1, and an aqueous solution made up of 5.0634 parts of water and 0.1566 part of sodium bisulfite prepared previously in other vessel, at a constant rate for, respectively, 6.75 hours and 7.25 hours.

From 7.5 hours after the initiation of polymerization, the monomer mixture liquid for the third stage as mentioned in TABLE 1 was added continuously at a constant rate for 3.5 hours. At 11 hours after the initiation of polymerization, the temperature was elevated to 63° C. and the polymerization was continued, and the polymerization was stopped by cooling to normal temperature at the time when the polymerization conversion rate reached 98-100%.

The obtained copolymer latex was adjusted to pH 7 with sodium hydroxide, 1.5 parts of sodium polyacrylate (ARON T-50 (TOA GOSEI)) was added, the unreacted monomers were removed by steam stripping method, evaporation was carried out under a reduced pressure, and the solid content was adjusted to 48% to obtain Copolymer Latex L2.

Synthesis Example 3

Production of Copolymer Latex L3

Into a thermo-controllable autoclave provided with a stirrer, there were added 159.36 parts of water, 5 parts, in terms of solid content, of the seed latex synthesized as above, 0.475 part of sodium dodecylbenzenesulfonate, 0.5 part of potassium persulfate, and the components for the first stage as mentioned in TABLE 1, and after elevating the temperature of the autoclave to 40° C., 0.06 part of sodium bisulfite and 0.0018 part of ferrous sulfate 7-hydrate were added and a polymerization was initiated.

At 0.75 hour after the initiation of polymerization, there were continuously added the monomer mixture liquid for the second stage as mentioned in TABLE 1, and an aqueous solution made up of 5.0634 parts of water and 0.1566 part of sodium bisulfite prepared previously in other vessel, at a constant rate for, respectively, 4.25 hours and 7.25 hours.

At 5 hours after the initiation of polymerization, there was collectively added an aqueous solution made up of 1.3786 parts of water and 0.05 part of potassium persulfate prepared previously in other vessel, and subsequently, there were continuously added the monomer mixture liquid for the third stage as mentioned in TABLE 1 (components excluding itaconic acid), at a constant rate for 2.5 hours.

From 5.5 hours after the initiation of polymerization, the polymerization temperature was changed, and was controlled so as to be 70° C. at 8 hours from the initiation of polymerization. It should be noted that itaconic acid in the components for the third stage in TABLE 1 was previously dissolved in 14.87 parts of water in other vessel, and was added at 6.5 hours after the initiation of polymerization at one time.

At 7.5 hours after the initiation of polymerization, an aqueous solution made up of 3.88 parts of water and 0.12 part of sodium bisulfite prepared previously in other vessel, was added continuously for 3 hours at a constant rate, the polymerization was continued, and the polymerization was stopped by cooling to normal temperature at the time when the polymerization conversion rate reached 98-100%.

The obtained copolymer latex was adjusted to pH 7 with sodium hydroxide, 1.5 parts of sodium polyacrylate (ARON T-50 (TOA GOSEI)) was added, the unreacted monomers were removed by steam stripping method, evaporation was carried out under a reduced pressure, and the solid content was adjusted to 48% to obtain Copolymer Latex L3.

TABLE 1

| Monomer composition (part by mass) | Copolymer Latex | | | | | | | | |
|---|---|---|---|---|---|---|---|---|---|
| | L1 | | | L2 | | | L3 | | |
| | First stage | Second stage | Third stage | First stage | Second stage | Third stage | First stage | Second stage | Third stage |
| Butadiene | 8.5 | 21.5 | 12 | 8.5 | 21.5 | 12 | 10.5 | 31 | 10.5 |
| Styrene | 4.5 | 16.1 | 14.3 | 4.5 | 16.1 | 14.3 | 2.5 | | 15 |
| Acrylonitrile | 3 | 3.4 | 9.6 | 3 | 3.4 | 9.6 | 3 | 12.5 | 8 |
| Methyl methacrylate | | | | | | | | | 2 |
| Acrylic acid | 7.1 | | | 7.1 | | | 4 | | |
| Itaconic acid | | | | | | | | | 1 |
| Methacrylic acid | | | | | | | | | |
| t-Dodecylmercaptan | 0.05 | 0.3 | 0.15 | 0.1 | 0.3 | 0.1 | 0.05 | 0.3 | 0.15 |
| α-Methylstyrene dimer | 0.2 | 0.6 | 0.1 | 0.2 | 0.6 | 0.1 | 0.08 | 0.3 | 0.04 |

Each of Copolymer Latex L1 to L3 obtained was subjected to the evaluations of toluene gel content, number average particle size, latex viscosity, weight average molecular weight, and THF gel content at a polymerization conversion rate of 50%. The results are shown in TABLE 2.

TABLE 2

| Item | Copolymer Latex | | |
|---|---|---|---|
| | L1 | L2 | L3 |
| Toluene gel content (%) | 95.0 | 95.7 | 89.5 |
| Number average particle size (nm) | 55 | 60 | 65 |
| Latex viscosity (mPa · s) | 120 | 115 | 84 |
| Weight average molecular weight | 51000 | 53000 | 78000 |
| THF gel content at polymerization conversion rate of 50% (%) | 21 | 24 | 18 |

Each of Copolymer Latex L1 to L3 was subjected to the evaluations of roll stain resistance, dry-pick strength, peeling strength of electrode layer, and press processability of electrode layer. The results are shown in TABLE 3.

TABLE 3

| Item | Copolymer Latex | | |
|---|---|---|---|
| | L1 | L2 | L3 |
| Roll stain resistance | 5.0 | 4.8 | 4.7 |
| Dry-pick strength | 4.8 | 4.9 | 5.0 |
| Peeling strength of electrode layer (mN/2 cm) | 136 | 138 | 142 |
| Press processability of electrode layer | A | A | A |

Comparative Example 1

Production of Copolymer Latex R1

Into a thermo-controllable autoclave provided with a stirrer, there were added 224 parts of water, 10 parts, in terms of solid content, of the seed latex synthesized as above, 0.95 part of sodium dodecylbenzenesulfonate, 1.3 parts of potassium persulfate, and the components for the first stage as mentioned in TABLE 4, and after elevating the temperature of the autoclave to 50° C., 0.04 part of sodium bisulfite and 0.0012 part of ferrous sulfate 7-hydrate were added and a polymerization was initiated.

At 0.75 hour after the initiation of polymerization, the temperature was elevated to 60° C., and there were continuously added the monomer mixture liquid for the second stage as mentioned in TABLE 4, and an aqueous solution made up of 1.6878 parts of water and 0.0522 part of sodium bisulfite prepared previously in other vessel, at a constant rate for, respectively, 4.75 hours and 7.25 hours.

From 5.5 hours after the initiation of polymerization, the monomer mixture liquid for the third stage as mentioned in TABLE 4 was added continuously at a constant rate for 2.5 hours.

At 8 hours after the initiation of polymerization, the temperature was elevated to 63° C., and there was continuously added an aqueous solution made up of 3.3756 parts of water and 0.1044 part of sodium bisulfite prepared previously in other vessel, at a constant rate for 3 hours. After the addition, the polymerization was continued as is, and the polymerization was stopped by cooling to normal temperature at the time when the polymerization conversion rate reached 98-100%.

The obtained copolymer latex was adjusted to pH 7 with sodium hydroxide, 1.5 parts of sodium polyacrylate (ARON T-50 (TOA GOSEI)) was added, the unreacted monomers were removed by steam stripping method, evaporation was carried out under a reduced pressure, and the solid content was adjusted to 48% to obtain Copolymer Latex R1.

Comparative Example 2

Production of Copolymer Latex R2

Into a thermo-controllable autoclave provided with a stirrer, there were added 224 parts of water, 2 parts, in terms of solid content, of the seed latex synthesized as above, 0.175 part of sodium dodecylbenzenesulfonate, 1.3 parts of potassium persulfate, and the components for the first stage as mentioned in TABLE 4, and after elevating the temperature of the autoclave to 50° C., 0.04 part of sodium bisulfite and 0.0012 part of ferrous sulfate 7-hydrate were added and a polymerization was initiated.

At 0.75 hour after the initiation of polymerization, the temperature was elevated to 60° C., and there were continuously added the monomer mixture liquid for the second stage as mentioned in TABLE 4, and an aqueous solution made up of 1.6878 parts of water and 0.0522 part of sodium bisulfite prepared previously in other vessel, at a constant rate for, respectively, 4.75 hours and 7.25 hours.

From 5.5 hours after the initiation of polymerization, the monomer mixture liquid for the third stage as mentioned in TABLE 4 was added continuously at a constant rate for 2.5 hours.

At 8 hours after the initiation of polymerization, the temperature was elevated to 63° C. and the polymerization was continued, and the polymerization was stopped by cooling to normal temperature at the time when the polymerization conversion rate reached 98-100%.

The obtained copolymer latex was adjusted to pH 7 with sodium hydroxide, 1.5 parts of sodium polyacrylate (ARON T-50 (TOA GOSEI)) was added, the unreacted monomers were removed by steam stripping method, evaporation was carried out under a reduced pressure, and the solid content was adjusted to 48% to obtain Copolymer Latex R2.

Comparative Example 3

Production of Copolymer Latex R3

Into a thermo-controllable autoclave provided with a stirrer, there were added 224 parts of water, 10 parts, in terms of solid solution, of the seed latex synthesized as above, 0.95 part of sodium dodecylbenzenesulfonate, 1.3 parts of potassium persulfate, and the components for the first stage as mentioned in TABLE 4, and after elevating the temperature of the autoclave to 50° C., 0.04 part of sodium bisulfite and 0.0012 part of ferrous sulfate 7-hydrate were added and a polymerization was initiated.

At 0.75 hour after the initiation of polymerization, the temperature was elevated to 60° C., and there were continuously added the monomer mixture liquid for the second stage as mentioned in TABLE 4, and an aqueous solution made up of 5.0634 parts of water and 0.1566 part of sodium bisulfite prepared previously in other vessel, at a constant rate for, respectively, 4.75 hours and 7.25 hours.

From 5.5 hours after the initiation of polymerization, the monomer mixture liquid for the third stage as mentioned in TABLE 4 was added continuously at a constant rate for 2.5 hours.

At 8 hours after the initiation of polymerization, the temperature was elevated to 63° C. and the polymerization was continued, and the polymerization was stopped by cooling to normal temperature at the time when the polymerization conversion rate reached 98-100%.

The obtained copolymer latex was adjusted to pH 7 with sodium hydroxide, 1.5 parts of sodium polyacrylate (ARON T-50 (TOA GOSEI)) was added, the unreacted monomers were removed by steam stripping method, evaporation was carried out under a reduced pressure, and the solid content was adjusted to 48% to obtain Copolymer Latex R3.

Comparative Example 4

Production of Copolymer Latex R4

Into an autoclave having a stirrer and a jacket for thermo-controlling attached, there were initially fed 125 parts of water and 3 parts of ADEKARIA SOAP SE1025N: produced by ASAHIDENKA (reactive emulsifier having polyoxyalkylene chain and sulfate group), and after replacing with nitrogen, the inside temperature was elevated to 80° C. Furthermore, there were prepared an oily mixture liquid of 2.5 parts of t-dodecylmercaptan and 100 parts of a monomer mixture made up of 35 parts of butadiene, 45 parts of styrene, 13 parts of methyl methacrylate, 2 parts of acrylic acid and 5 parts of methacylic acid; and an aqueous solution made up of 28 parts of water, 1.2 parts of sodium peroxybisulfate, 0.2 part of sodium hydroxide and 1 part of the reactive emulsifier same as above, and the resulting oily mixture liquid and the resulting aqueous solution were added at a constant rate for, respectively, 5 hours and 6 hours after replacing with nitrogen.

The polymerization reaction was completed by maintaining the temperature of 80° C. for 1 hour, and the system was then cooled. Next, the obtained copolymer latex was adjusted to pH 7 with sodium hydroxide, the unreacted monomers were removed by steam stripping method, and the solid content was adjusted to 48% to obtain Copolymer Latex R4.

TABLE 4

| Monomer composition (part by mass) | R1 First stage | R1 Second stage | R1 Third stage | R2 First stage | R2 Second stage | R2 Third stage | R3 First stage | R3 Second stage | R3 Third stage | R4 |
|---|---|---|---|---|---|---|---|---|---|---|
| Butadiene | 8.5 | 24.7 | 13.8 | 8.5 | 24.7 | 13.8 | 8.5 | 21.5 | 12 | 35 |
| Styrene | 4.5 | 8.3 | 9.1 | 4.5 | 10.3 | 9.1 | 4.5 | 16.1 | 14.3 | 45 |
| Acrylonitrile | 3 | 8 | 13 | 3 | 8 | 13 | 3 | 3.4 | 9.6 | |
| Methyl methacrylate | | | | | | | | 41 | | 13 |
| Acrylic acid | 2.1 | | 5 | 5.1 | | | 7.1 | | | 2 |
| Itaconic acid | | | | | | | | | | |
| Methacrylic acid | | | | | | | | | | 5 |
| t-Dodecylmercaptan | 0.05 | 0.3 | 0.2 | 0.05 | 0.3 | 0.2 | 0.05 | 0.3 | 0.15 | 2.5 |
| α-Methylstyrene dimer | 0.2 | 0.6 | 0.1 | 0.2 | 0.6 | 0.1 | | | | |

Each of Copolymer Latex R1 to R4 obtained was subjected to the evaluations of toluene gel content, number average particle size, latex viscosity, weight average molecular weight, and THF gel content at a polymerization conversion rate of 50%. The results are shown in TABLE 5.

TABLE 5

| | Copolymer Latex | | | |
|---|---|---|---|---|
| Item | R1 | R2 | R3 | R4 |
| Toluene gel content (%) | 91.6 | 92.1 | 95.0 | 61.2 |
| Number average particle size (nm) | 58 | 93 | 85 | 64 |
| Latex viscosity (mPa · s) | 1400 | 180 | 70 | 1800 |
| Weight average molecular weight | 49000 | 50000 | 51000 | 60000 |
| THF gel content at polymerization conversion rate of 50% (%) | 21 | 24 | 42 | 6 |

Each of Copolymer Latex R1 to R4 was subjected to the evaluations of roll stain resistance, dry-pick strength, peeling strength of electrode layer, and press processability of electrode layer. The results are shown in TABLE 6.

TABLE 6

| | Copolymer Latex | | | |
|---|---|---|---|---|
| Item | R1 | R2 | R3 | R4 |
| Roll stain resistance | 4.6 | 4.5 | 2.5 | 2.3 |
| Dry-pick strength | 5.0 | 3.5 | 2.6 | 2.0 |
| Peeling strength of electrode layer (mN/2 cm) | 138 | 86 | — | — |
| Press processability of electrode layer | A | A | — | — |

The invention claimed is:

1. A copolymer latex containing a copolymer comprising:
   (A) 20 to 80% by mass of a structural unit derived from an aliphatic conjugated diene monomer,
   (B) 4 to 15% by mass of a structural unit derived from an unsaturated carboxylic acid monomer, wherein the unsaturated carboxylic acid monomer contains 0 to 1% by mass of a dicarboxylic acid, and
   (C) 5 to 76% by mass of a structural unit derived from other copolymerizable monomer, wherein the total of (A), (B) and (C) being 100% by mass, the copolymer latex having a number average particle size of 30 to 80 nm by measurement with a transmission electron microscope, and having a viscosity of 50 to 400 mPas at a solid content of 48% by mass,
   wherein said copolymer is produced by batch-polymerization.

2. The copolymer latex according to claim 1, having, as the structural unit (C) derived from other copolymerizable monomer of the copolymer, 5 to 40% by mass of a structural unit derived from an α,β-unsaturated nitrile compound.

3. The copolymer latex according to claim 1, having, as the structural unit (C) derived from other copolymerizable monomer of the copolymer, 5 to 40% by mass of a structural unit derived from an aromatic vinyl compound.

4. The copolymer latex according to claim 1 wherein the number average particle size is 30 to 75 nm.

5. The copolymer latex according to claim 1, wherein the viscosity is 80 to 400 mPa·s.

6. A composition for coating paper comprising the copolymer latex according to claim 1 and a pigment.

7. A coated paper having a coating layer obtained by coating and drying the composition for coating paper according to claim 6.

8. The copolymer latex according to claim 1, wherein 70% by mass or more of total amount of the unsaturated carboxylic acid monomer (b) is used at the initial feeding stage of the batch-polymerization.

* * * * *